United States Patent
Galyas et al.

(10) Patent No.: US 6,826,168 B2
(45) Date of Patent: Nov. 30, 2004

(54) SYSTEM AND METHOD RELATING TO DIGITAL MOBILE COMMUNICATION SYSTEMS

(75) Inventors: Peter Galyas, Täby (SE); Lars Westberg, Enköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 776 days.

(21) Appl. No.: 09/732,353

(22) Filed: Dec. 7, 2000

(65) Prior Publication Data

US 2001/0004355 A1 Jun. 21, 2001

(30) Foreign Application Priority Data

Dec. 17, 1999 (SE) .............................................. 9904632

(51) Int. Cl.[7] ................................................. H04Q 7/22
(52) U.S. Cl. ...................................... 370/340; 370/466
(58) Field of Search .................................. 370/340, 466

(56) References Cited

U.S. PATENT DOCUMENTS 6,122,607 A * 9/2000 Ekudden et al. ............ 704/212
6,633,536 B1 * 10/2003 Suvanen ...................... 370/216

FOREIGN PATENT DOCUMENTS

| EP | 0888022 A2 | 12/1998 |
| EP | 0998057 A1 | 8/1999 |
| WO | 96/27963 | 9/1996 |
| WO | 99/21383 | 4/1999 |

* cited by examiner

Primary Examiner—Melvin Marcelo (57) ABSTRACT

The present invention relates to a mobile communication system supporting communication of data which comprises a base station communicating with a switching arrangement. A communication protocol is used for communication between a mobile station and the switching arrangement. The connection between the base station and the switching arrangement supports packet switched communication and detecting means are provided in the base station to detect if data frames sent from the mobile station are correctly received over the air interface. Means are also provided for sending only data frames detected as correctly received onto the switching arrangement using the packet switched connection between the base station and the switching arrangement.

9 Claims, 9 Drawing Sheets

|  | E2 | E3 |
|---|---|---|
| 1:ST MODIFIED CCITT V.110 80 BIT FRAME | 0 | 0 |
| 2:ND —————————,,————————— | 0 | 1 |
| 3:RD —————————,,————————— | 1 | 0 |
| 4:TH —————————,,————————— | 1 | 1 |

*Fig. 4A*

| OCTET NO. | BIT NUMBER | | | | | | | |
|---|---|---|---|---|---|---|---|---|
|  | 0 | 1 | 2 | 3 | 4 | 5 | 6 | 7 |
| 0 | 0 | 0 | 0 | 0 | 0 | 0 | 0 | 0 |
| 1 | 1 | D1 | D2 | D3 | D4 | D5 | D6 | D'1 |
| 2 | 1 | D7 | D8 | D9 | D10 | D11 | D12 | D'2 |
| 3 | 1 | D13 | D14 | D15 | D16 | D17 | D18 | D'3 |
| 4 | 1 | D19 | D20 | D21 | D22 | D23 | D24 | D'4 |
| 5 | 1 | E1 | E2 | E3 | D'5 | D'6 | D'7 | D'8 |
| 6 | 1 | D25 | D26 | D27 | D28 | D29 | D30 | D'9 |
| 7 | 1 | D31 | D32 | D33 | D34 | D35 | D36 | D'10 |
| 8 | 1 | D37 | D38 | D39 | D40 | D41 | D42 | D'11 |
| 9 | 1 | D43 | D44 | D45 | D46 | D47 | D48 | D'12 |

SYSTEM AND METHOD RELATING TO DIGITAL MOBILE COMMUNICATION SYSTEMS

This application claims priority under 35 U.S.C. §§119 and/or 365 to SE 9904632-8 filed in Sweden on Dec. 17, 1999; the entire content of which is hereby incorporated by reference.

BACKGROUND

The present invention relates to transmission of data in digital mobile communication systems, in particular to a system and a method for non-transparent transmission of data in digital mobile communications system.

In digital mobile communication systems data can be transmitted physically in two different manners, namely transparently and non-transparently. For transparent transmissions, data is transferred transparently over a traffic channel of the mobile communication system which means that error correction on the radio path is performed through the use of channel coding only. For example for the GSM system a channel coding scheme denoted Forward Error Correction (FEC) is used.

For non-transparent transmissions, in addition to channel coding as referred to above, a further protocol is used according to which the data transmission over the traffic channel is repeated if the data was not received correctly at the receiving side. In the GSM system such further communication protocol is denoted Radio Link Protocol (RLP). It is used between terminal adapting means of a mobile station and network adapting means, e.g. an InterWorking Function IWF, which mostly is provided at a Mobile Switching Center MSC, or in association therewith. The RLP is a balanced data transfer protocol of HDLC type which has a frame structure. Error correction by the RLP is based on re-transmission of frames corrupted over the traffic channel. There is also another protocol L2R (Layer 2 Relay) above the RLP. Generally there are functional means both in the mobile station (i.e. in its terminal adapter) and in the Inter Working Function handling such protocol. Data is normally transported in RLP frames over the radio interface between the functional means handling the RLP protocol in the mobile station and in an IWF, respectively. In a normal data transfer state, i.e. for the 9,6 kbps channel that uses 12 kbps on the radio channel, the functional means provides for packing the data into 200-bit PDU:s—(Packet Data units) transferred in 240 bit RLP-frames over the radio interface to another functional means.

So called Discontinuous Transmission (DTX) is advantageously applied when there is no data or other information to be transferred. DTX is a method for reducing transmission on the radio path as much as possible when there is actually no data to be transferred, which means that the transmission is interrupted. The reason for using DTX is to reduce power consumption in the transmitting means, which is of the utmost importance for mobile stations, and also to reduce the overall interference level on the radio path. DTX operates in an independent manner for the uplink and for the downlink, respectively. DTX may be implemented or not in a mobile communications network, i.e. either the network allows DTX or not.

In mobile communication systems implementing TDMA (Time Division Multpile Access) e.g. GSM, each mobile station is assigned one traffic channel for transmission of speech or data. There can thus be maximum eight parallell connections to different mobile stations on one and the same carrier wave for fullrate transmission. Therefore the maximum transfer rate for data is limited to quite a low level due to the available bandwidth, the channel coding and the error correction; thus for the GSM system it is limited to 14.5 kbps, (12 kbps, 6 kbps or 3.6 kbps). However, in e.g. GSM all terrestrial transmission is based on circuit switched transmission.

Through the introduction of GPRS (the packet data service for GSM, General Packet Radio Service), EDGE (Enhanced Data Rates For Global Evolution) and Adaptive Multi Rate (AMR) speech codecs in GSM the bandwidth can be increased and varied. The transmission structure within the Base Station Subsystem (BSS), however, has not been changed in order to be able to take advantage of such development. For private networks or for office solutions, GSM systems are evolving which use the normal LAN (Local Area Network)/Intranet within the company, i.e. IP based transmission is used. However, the QoS issue is not addressed in any other manner than through over-provisioning within an office or with any other QoS mechanisms supported by the computer LAN infrastructure. The bandwidth is also cheap using LAN/Ethernet technologies. However, for public solutions the situation is different and the bandwidth is expensive.

For transmission of non-transparent data within GSM, DTX is supported which means if there is no data to be sent, the radio transmitter can be turned off. In GSM all terrestrial transmission is actually based on circuit switched transmission. Through the introduction of GPRS, the current GSH system is actually upgraded to support packet switched services over the radio interface. Thus a DTX functionality can be used for statistical multiplexing between mobile station and the BTS (Base Transceiver Station), i.e. on the radio path. For the terrestrial transmission packet switching is being defined within the GPRS Core network and the interface (Gb) to BSS (Base Station Subsystem).

In GSM a so called Transcoder and Rate Adaptor Unit, TRAU, which is a transcoder unit that may be arranged apart from the base station, is provided. TRAU communicates with the channel coding unit for example of a BTS which communication is defined in GSM recommendation 08.60. On the uplink direction the BTS always sends the frames received over the radio interface. On the downlink direction the Inter Working Function IWF, which generally is provided in the MSC, which comprises network adapting functionality, indicates whether the frame shall be sent or not by inband signalling within the Radio Link Protocol RLP, frames that are always sent to the BTS via TRAU. As can be seen, much idle data is sent which is a waste of resources.

Through the introduction of High Speed Circuit Switched Data, HSCSD, it gets possible to use several Time Slots (TSs) on the radio interface to one mobile station. Transmission can be transparent as well as non-transparent. For transparent services, the number of TSs are the same on the uplink and on the downlink. For non-transparent transmission there also exists asymmetrical usage of the TSs. The reason therefore is that the typical data services like webbrowsing are highly asymmetrical and that the MS implementation faces a threshold in cost if data has to be sent and received at the same time. Therefor most HSCSD MSs will support asymmetrical use of times slots with the relations 1/1, 1/2, 2/2, 1/3, 1/4 meaning one time slot on the uplink, one on the downlink, one on the uplink, two on the downlink etc. Non-transparent services also have the advantage over transparent services that they include the possibility of adaptive radio resource handling. This means that a data user is guaranteed the connection on one time slot and addition thereto can use available radio resources in the cell. The case is similar for GPRS wherein the MS only uses the radio resources when needed. Also here the usage can be asymmetrical. The MS design problems are similar to HSCSD.

To summarize, currently there is no satisfactory solution as to how to provide for an efficient usage of resources, e.g. on the fixed or terrestrial connection between base station and switching arrangement when packet based services are introduced.

SUMMARY

What is needed is therefore a communication system supporting communication of data which has a transmission efficiency which is increased as compared to hitherto known systems. Particularly, a system is needed, through which the fixed connection can be used more efficiently for non-transparent data transmission. Further yet a system is needed through which bandwidth can be used efficiently and which is cheap and easy to implement. Moreover, a method for transmission of data in a mobile communication system is needed, through which the above mentioned objects can be fulfilled.

Therefor a mobile communication system supporting communication of data is provided which comprises at least one base station connected to a switching arrangement over a connection and uses a communication protocol for communication between a mobile station and the switching arrangement. The connection between the base station and the switching arrangement supports packet switched communication of data and means are provided for detecting in the base station if data frames sent from the mobile station are correctly received over the air interface. Moreover means are provided for sending only data frames detected as correctly received on to the switching arrangement using the packet switched connection between the base station and the switching arrangement.

Particularly non-transparent communication of data transported as data frames is established on the uplink from the mobile station. Further still the means for detecting in a preferred embodiment comprises means for calculating a frame checksum for a received data frame. In an alternative implementation the quality of the radio transmission is detected in the base station to detect if a data frame is correctly received. This can be done as an alternative to, or, in combination with, the calculation of a frame checksum. In one implementation the switching arrangement is a Mobile Switching Center (MSC).

Alternatively the switching arrangement is a Base Station Controller (BSC), the base station is a Base Transceiver Station (BTS) and packet switched communication of data is supported at least on the uplink between the Base Tranceiver Station (BTS) and the Base Station Controller (BSC).

Particularly the BSC includes transcoding and adapting means for communication with an interworking function of a mobile switching center which comprises means for building frames for transportation of data, the transcoding and adapting means detecting if frames received from the mobile switching center contain data and sending only data frames on to the base station. In an advantageous implementation packet switched communication of data is supported between the base station and the switching arrangement also on the downlink.

The inventive concept is also applicable to a mobile communication system supporting communication of packet data. The system comprises at least one base station connected to a switching arrangement over a connection and a uses communication protocol for communication between the mobile station and the switching arrangement.

The connection between the base station and the switching arrangement supports packet switched communication of data and means are provided for detecting in the base station if data frames sent from the mobile station are correctly received over the air interface. Moreover means are provided for sending only data frames detected as correctly received on to the switching arrangement using the packet switched connection between the base station and the switching arrangement. Advantageously the means for detecting comprises means for calculating a frame chechsum for a received data frame.

Particularly non-transparent communication of packet data is supported and packet switched communication is supported also on the downlink from the switching arrangement to the base station.

According to the present invention it is suggested to introduce packet switched transmission within the BSS in order to increase the flexibility in the transmission efficiency when using statistical multiplexing. It is particularly suggested to use the Internet Protocol (IP). Other alternatives are for example to use ATM (Asynchronous Transfer Mode) or Frame Relay. To introduce Quality of Service (QoS) in an IP network a standard called Differentiated Services is evolving which is based on using priority bits in the IP header. The standard is being standardised by IETF (Internet Engineering Task Force), cf. RFC (Request For Comment) 2475, "An architecture for differentiated services." However, when packet based transmission is introduced into GSM BSS, it is required that it be possible to meet the current delay requirements of GSM, speech being the most delay sensitive traffic and has to be put in the highest delay priority class. Other services, for which the delay requirements are less strict, will be assigned a lower priority class, e.g. non-transparent data, which have a variable delay by default.

Particularly, for non-transparent data it is allowed for DTX to be used for statistical multiplexing on the fixed connection, which is extremely advantageous. Even more particularly, DTX can be used for statistical multiplexing between the BTS (in GSM) and the TRAU (Transcoder and Rate Adaptor Unit) in BSC. Even more particularly it may be implemented between BTS and MSC. For GPRS the inventive concept can be implemented between BTS and SGSN or BTS and BSC. The TRAU of GSM here corresponds to PCU that may be located either in BSC or SGSN.

To meet the above mentioned objects a method of transmitting data in a mobile communication system is provided. The method comprises the steps of; establishing a non-transparent data connection between a mobile station and a switching arrangement, comprising an air interface between the mobile station and a base station and a packet switched connection between the base station and the switching arrangement; detecting in the base station if data frames sent from the mobile station are correctly received over the air interface; and sending only data frames detected as correctly received on to the switching arrangement using the packet switched connection between the base station and the switching arrangement. In a preferred embodiment the step of detecting comprises using a frame checksum defined in the non-transparent data protocol to establish if the data frames are correctly received.

As an alternative, or an additional, step, the method comprises the step of; performing radio quality measurements in the base station to establish if data frames are correctly received over the air interface from the mobile station. In a particular implementation the method further comprises the step of; detecting in the base station if a received time slot from the mobile station is symmetrical, and, only if the time slot is symmetrical, sending data packets over the packet switched connection to the switching arrangement.

In an advantageous implementation the method includes the step of; implementing packet switched transmission also on the downlink from the switching arrangement to the base station.

The invention concept is also applicable to a mobile communication system supporting communication of packet data. The method then comprises the steps of; establishing a non-transparent data connection between a mobile station and a switching arrangement, comprising an air interface between the mobile station and a base station and a packet switched connection between the base station and the switching arrangement; detecting in the base station if data frames sent from the mobile station are correctly received over the air interface; and sending only data frames detected as correctly received on to the switching arrangement using the packet switched connection between the base station and the switching arrangement.

Particularly the step of detecting comprises using a frame checksum, defined in the non-transparent data protocol, to establish if the data frames are correctly received. Moreover, in an advantageous implementation, the method also comprises the step of; implementing packet switched transmission on the downlink from the switching arrangement to the base station. Substantially the same inventive procedure as described more in detail with reference to the uplink is also implemented for the downlink in advantageous embodiments.

Particularly the inventive concept is applicable to circuit switched data and packet switched data (GPRS), single and multislot, in any combination, and to packet based transmission in the radio access network.

Moreover, the invention also covers all kinds of mapping between radiocarrier (circuit switched (CS) or packet switched (PS) solutions) and core network (CS or PS). This is actually the case for UMTS (Universal Mobile Telephone System) and can also be implemented for GSM/GPRS/ EDGE. Thus a circuit switched radio channel can be connected to the packet switched core network of GPRS or a GPRS packet switched radio channel can be connected to a circuit switched carrier of the circuit switched core network of e.g. GSM. What is implemented depends only on the requirements imposed by the implemented service. Thus could e.g. GSM-interfaces A and Gb be migrated to the In-interface of UMTS.

It is an advantage of the invention that the overall flexibility and transmission efficiency is considerably increased.

BRIEF DESCRIPTION OF THE DRAWINGS

The invention will in the following be more thoroughly described in a non-limiting manner and with reference to the accompanying drawings, in which.

DETAILED DESCRIPTION

In general the description of the various embodiments is based on circuit switched data, i.e. systems supporting communication of circuit switched data. However, similar solutions are also implementable for mobile communication systems supporting communication of packet switched data, like for example GSM GPRS (General Packet Radio Service), P-PDC (Packet-Personal Digital Communications), ADCD etc. In general terms the solution to the problems initially referred to, in the uplink direction, consists in filtering the input from the radio interface in order to distinguish whether a frame is correctly received from a mobile station, in the following denoted an MS, or not.

In the circuit switched data services no CRC (Cyclic Redundancy Check) is applied in the baseband processing on the Channel Coding Blocks (CCB) as it is done for speech for detecting bad frames. Instead a higher level protocol between the MS and the IWF, in or associated with a Mobile Switching Center MSC, uses RLP frames with CRC to detect bit errors in the RLP frame.

In one particular embodiment the RLP checksum is used in the Base Transceiver Station BTS. That allows to filter out all the bad frames, which for non-transparent data means all frames with one or more bit errors and this increases the efficiency even more than is provided for through using DTX alone.

The RLP checksum is advantageously used in the IWF and MS in order to evaluate if a frame is error free. If it contains errors, no frame was sent or it was corrupted over the radio interface and it will then be re-transmitted For asymmetrical services (an asymmetrical time slot TS) the non-used uplink TSs are known to the BTS and therefor the BTS will not have to send on any frames at all.

(In state of the art systems the BTS sends idle frames over the allocated CS (circuit switched) channel.) This implies also a change in the BTS TRAU protocol since the BTS controls each sub-channel in the TRAU by a symmetrical inband control protocol, the definition of which however not being part of the present invention.

For 9.6 kbps data there is a one-to-one mapping between the frames over the radio interface (Channel Coding Blocks) and the RLP frames. For 4.8 and 14.4 kbps data this is not the case since the RLP frame here consists of two Channel Coding Blocks. Thus, buffering must be applied for such data having as a consequence a delay of 20 ms. (cf. GSM 05.03)

Particularly, for 4.8 kbps data there is a strict mapping between RLP and the radio interface (CCB) giving an additional delay that can be between 0 and 20 ms depending on the phase of the radio interface timing.

For 14.4 kbps there is no such mapping. Instead an inband-signalling is used, two half FLP-frames being marked through a bit. This does not give any extra delay.

The invention will in the following be further described with particular reference to the GSM system, although the inventive concept also is applicable to other digital mobile communication systems. Furthermore it particularly relates to a communication system using Time Division Multiple Access (TDMA) although it is applicable to systems using other multiple access methods such as CDMA and FDMA. FIGS. 1B and 1C very schematically illustrate how the invention can be implemented in GPRS.

Figure 1A:
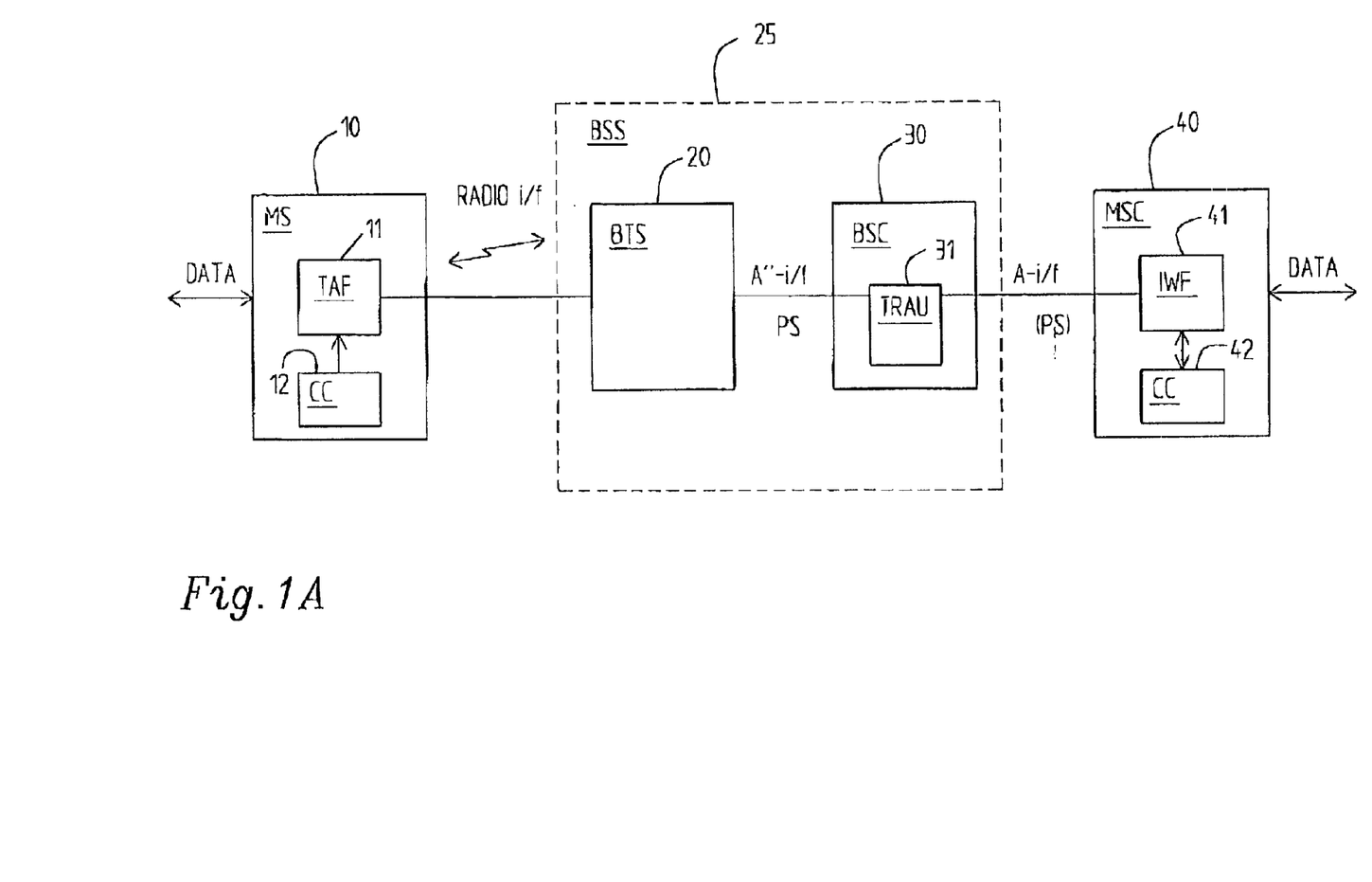
FIG. 1A very schematically illustrates a mobile communication system, e.g. GSM, in which an MS can communicate with an MSC via the BSS on a non-transparent connection and wherein the inventive concept is implemented between BSC and BTS, FIG. 1B very schematically illustrates one example on how the invention can be implemented in GPRS, FIG. 1C very schematically illustrates another example on how the invention can be implemented in GPRS.
Figure 1B:
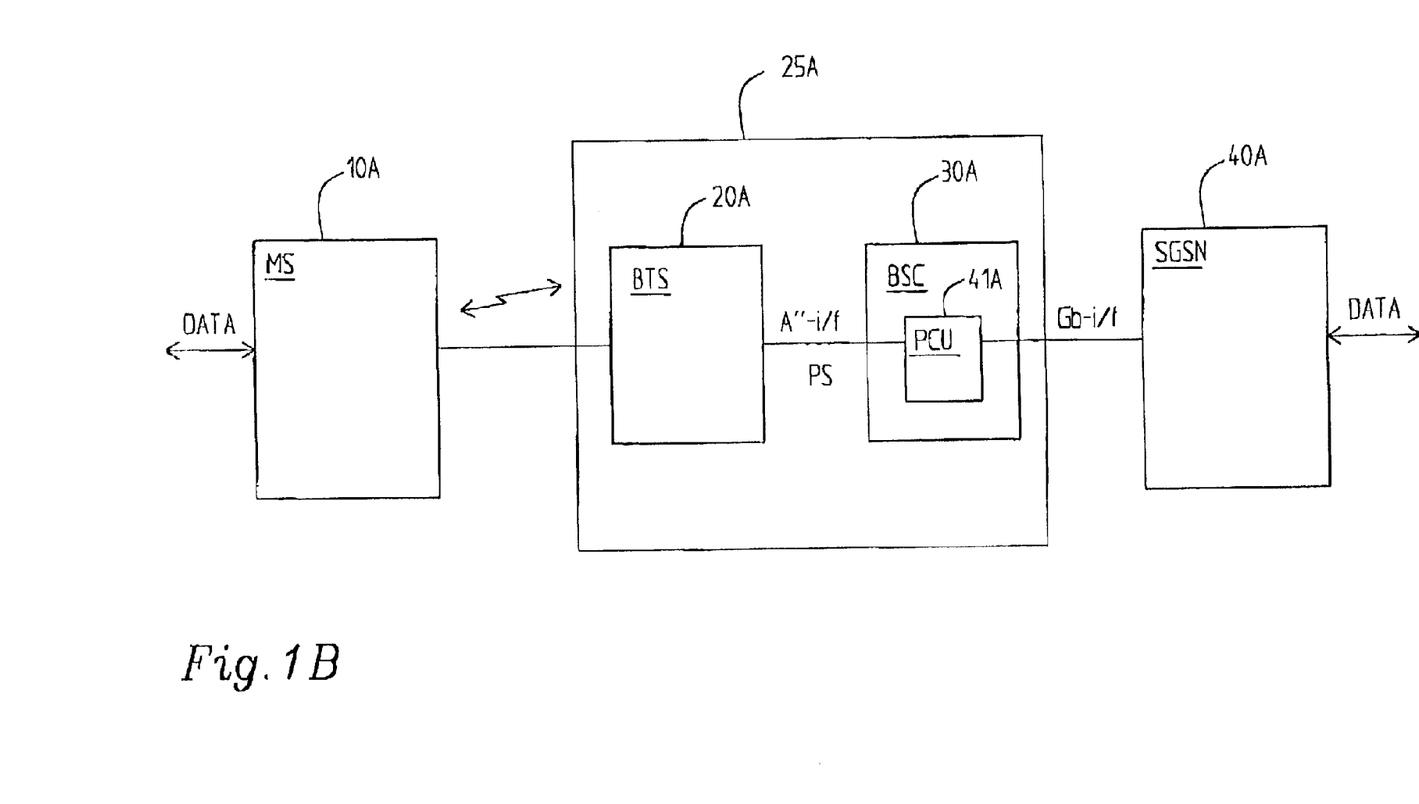
Figure 1C:
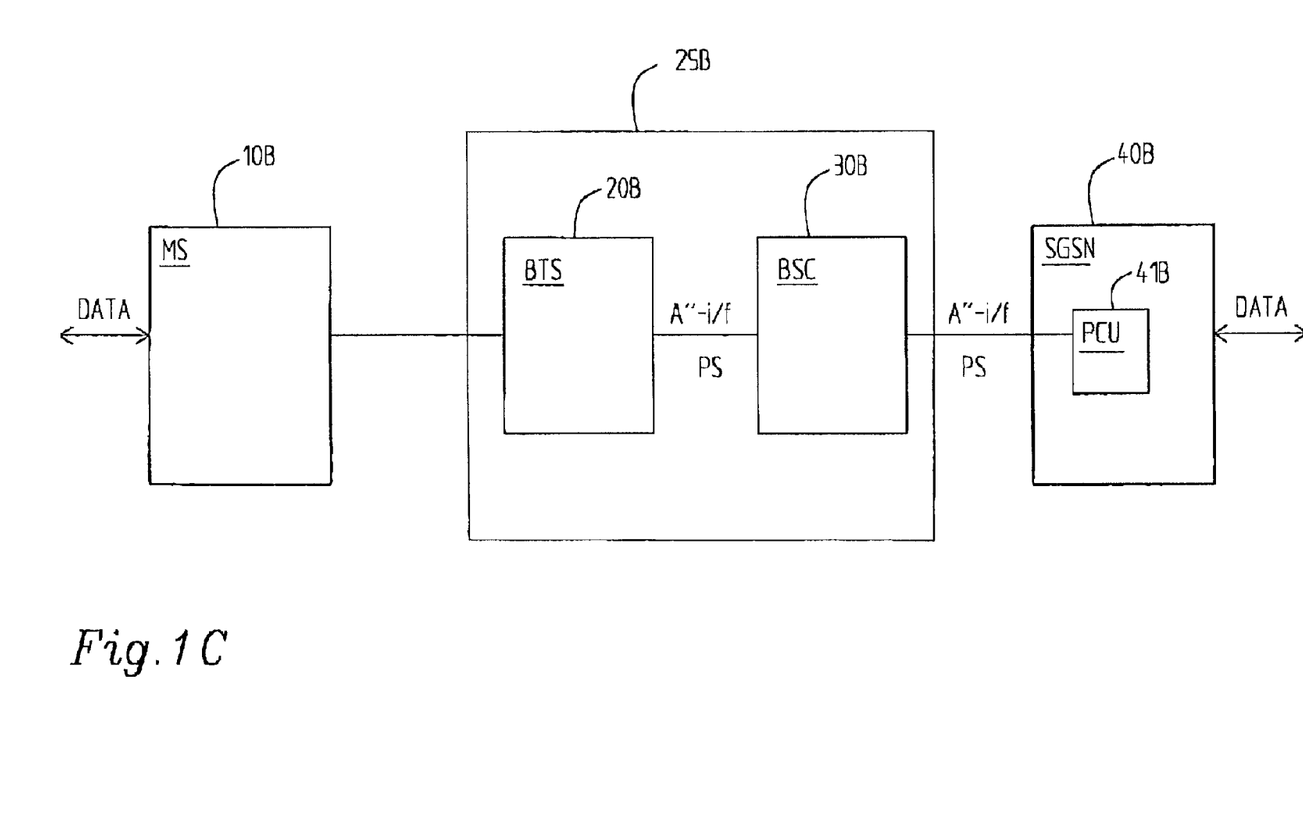

FIG. 1A schematically illustrates the functioning of the GSM system in which a Mobile Switching Center MSC 40 is responsible for the connection of incoming and outgoing calls and which acts as a switching arrangement over a public switched telephone network in general and the application of the inventive concept thereto for one embodiment. In addition thereto it handles functionalities characteristic for mobile communications such as for example Subscriber Location Management etc.

Mobile station MS 10 is connected to MSC 40 over a Base Station System BSS 25 which in GSM comprises a Base Transceiver Station 20 and a Base Station Controller BSC 30. The GSM system implements TDMA traffic as sent in TDMA frames over the radio path. A TDMA frame comprises a number of time slots in each of which an information packet is sent as a radio frequency burst. The channel structures which are used on the radio interface of the GSM system are for example defined in the GSM Recommendation 05.02. In the GSM system a data link is established between a Terminal Adapting Function TAF 11 (in MS) and a network adapting means InterWorking function means IWF 41 in a fixed network, mostly in or in association with the MSC 40. The data link is in this embodiment a circuit switched connection serving a number of traffic channels from the radio interface throughout the connection. For GSM the data link in data transfer is V.110 rate adapted, V.24 interface compatible, UDI coded digital full duplex connection. The V.110 connection is a digital transmission channel, cf. CCITT Recommendation Blue Book V.110. The Terminal Adapting Means TAF 11 adapts a data terminal TA (FIG. 5) connected to the MS for the V.110 connection which here is established over a circuit switched connection using one or more time slots or traffic channels. For 14.4 kbps other protocols are used. Therefore any detailed description will differ; however, the principles remain the same and it should be obvious from the detailed description how it can be implemented to e.g. 14.4 kbps.

The IWF adapts the V.110 connection to another V.110 network such as an ISDN or another GSM network or to another transit network, e.g. PSTN. The traffic channel moreover uses Forward Error Correction (FEC) channel coding, having as an object to reduce the effect of transmission error over the radio path. The GSM system implements convolution coding according to GSM Recommendation 05.03. A full-rate GSM traffic channel uses data rates of 14.4 kbps, 9.6 kpbs, 4.8 kpbs and 2.4 kpbs.

Between the BSC 30 and IWF 41 in GSM the so called A-interface is used and according to the invention packet switched transmission is enabled either between BSC, also called a (second) switching arrangement and base station BTS or between BTS and MSC also denoted a (first) switching arrangement in the general description of the invention. This relates to two different embodiments.

According to the invention, packet switched transmission is at least introduced between BTS 20 and BSC 30. The terminal interface between TAF 11 and the data terminal equipment (not shown) and the interface between the IWF 41 and for example an audio modem 42 (FIG. 5) meet the requirements of CCITT V.24 and in FIG. 5 the terminal interface is denoted L2. The L2R protocol (Layer 2 Relay) and the RLP (Radio Link Protocol) are both at the TAF 11 and IWF 41 at both ends of the connection. In addition thereto the connection comprises different kinds of Rate Adapting Functions (RA functions) of which RA 1' is provided between TAF 11 (MS/TAF 10) and, according to the embodiment specifically described and which permits packet based communication between BTS and BSC, in the TRAU 31 (cf. FIG. 5). (In an alternative implementation RA1 and RA1' are also provided in CCU 33.)

Figure 5:
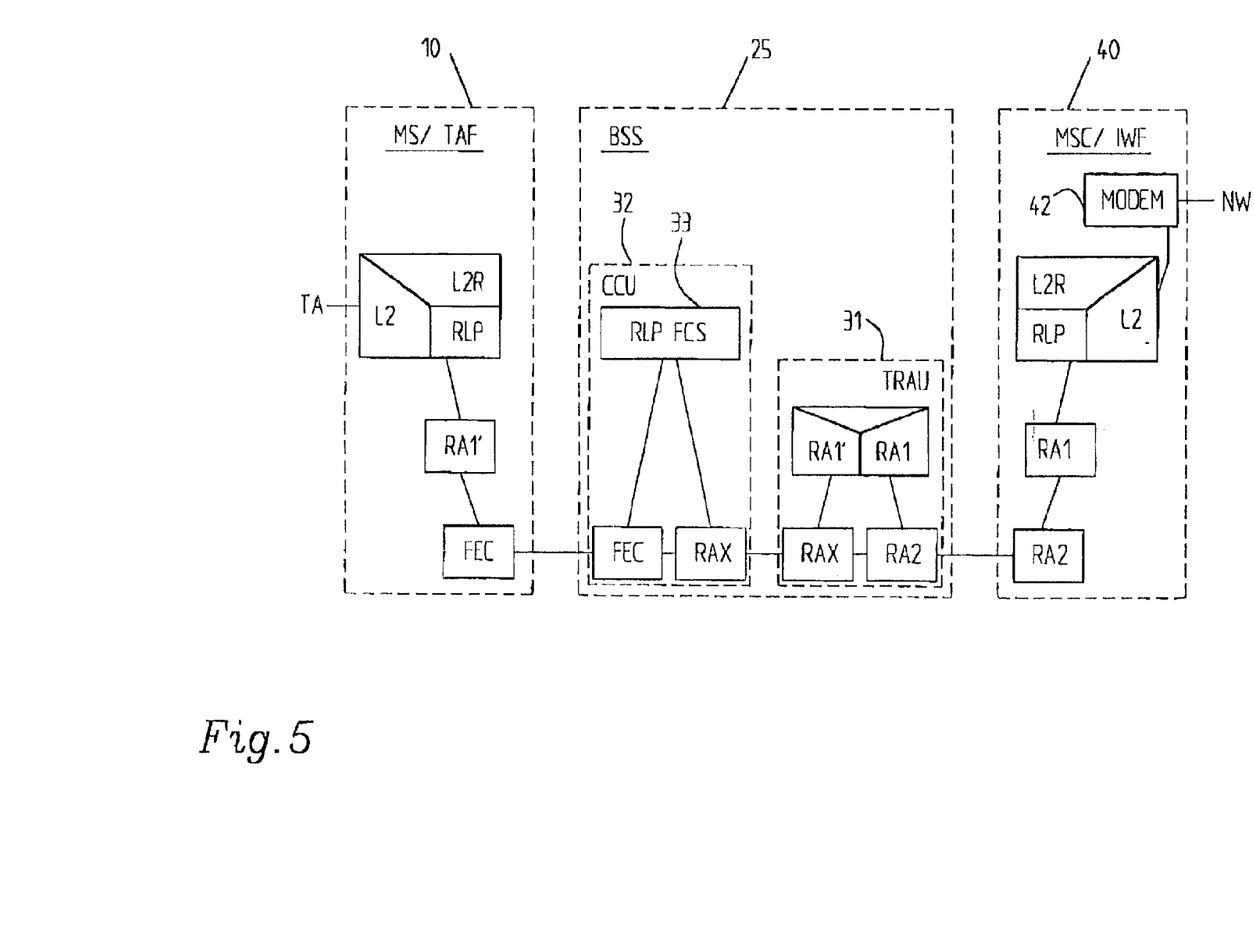
FIG. 5 is a block diagram illustrating the functional units of a non-transparent GSM traffic channel on different protocol levels modified according to the invention.

RA 1 is provided between the IWF 41 and, according to the illustrated embodiment, TRAU 31. Furthermore RA 2 is provided between TRAU 31 and IWP 41. Moreover a further Rate Adapting function RAX is provided between CCU 32 and TRAU 31. The Rate Adapting functions are defined in the GSM Recommendations 04.21 and 08.20 (RA 1, RA 2, RA 1'); RAX and the additional introduction of RA 11 and RA 1 in TRAU 31, is provided for through the present invention, as well as the exclusion of RA 1 and RA 1' in CCU 32.

Figure 3:
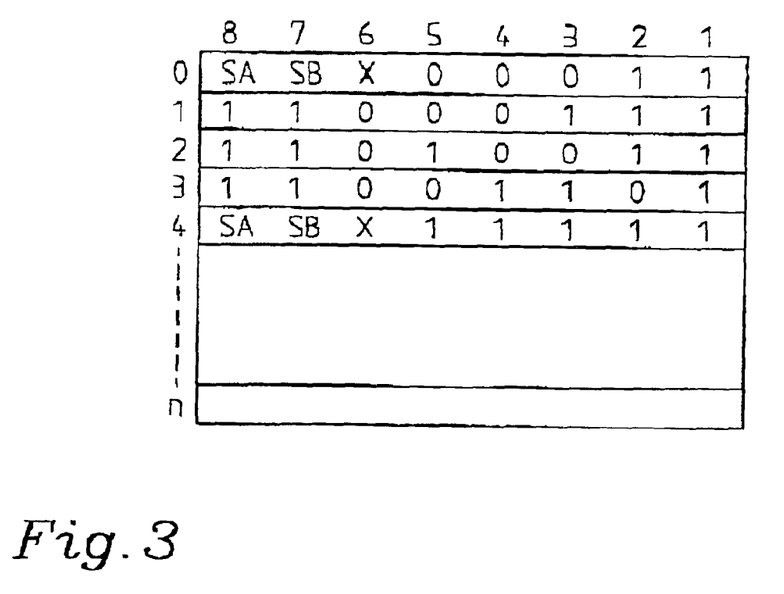
FIG. 3 illustrates a L2R Packet Data Unit.

Communication between CCU 32 and TRAU 31, is defined in GSM 08.60 which however is affected through the present invention. The L2R (Layer 2 Relay) functionality for non-transparent protocols is for example defined in GSM Recommendation 07.02. L2R packs user data and status information originating from the terminal interface into 200-bit, 25 octet lines PDUs (Protocol Data Units) which for example are illustrated in FIG. 3. The octets are numbered 0-24, wherein octet 0 is transmitted first. The bits in the octets are numbered 1–8, bit 1 is being transmitted first. In a PDU the octet may comprise a status octet, a character (higher layer data) or filler bits. Octet 0 is always a status octet. The status octet comprises 3 bits SA, SB and X for the status of the V.24 connection and 5 bits indicating the number of data octets succeeding the status octet and in addition thereto the special indications of the data octets, e.g. empty, PDU. In the figure a status octet 0 is succeeded by three data octets. Thereafter a new status octet 4 follows.

Figure 2:
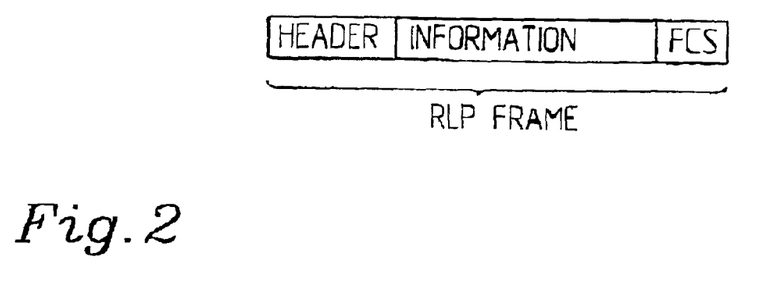
FIG. 2 illustrates a RLP frame.

In FIG. 2 an RLP frame is schematically illustrated. An RLP frame consists of a header, an information field and a Frame Check Sequence (FCS) field. It has a fixed length of either 240 or 576 bits. The size of the components depend on the radio channel type, RLP version and on the RLP frame. The basic frame structure of an RLP frame is discussed in GSM 04.22 "Digital Cellular Communication System (Phase 2+); Radio Link Protocol (RLP) for data- and telematic services on the Mobile Station-Base Station System (MS-BSS) interface and the Base Station-Mobile Services Switching Center (BSS-MSC) interface, GSM 04.22 Version 7.0.0 (released 1998). This document is herewith incorporated herein by reference thereto, as are the other documents referred to in the specification. An RLP header carries one of three types of control information, the first being an unnumbered protocol control information (U frame), the second being supervisory-information (S frame) and the third being user information carrying supervisory information piggybacked (I+S frame). The header is to be transmitted from the left to the right and the FCS is to be transmitted starting with the highest order term and the order of bit transmission for the information field is from the left to the right. The FCS is further explained in chapter 4.4 of the above mentioned document (GSM 04.22).

L2R PDU is packed in an RLP frame as discussed above. As referred to earlier in this application, and in the above mentioned GSM 04.22, RLP is a balanced HDLC type data transfer protocol with a frame structure in which error correction is based on retransmission of corrupted frames at the request of the receiving party. The RLP protocol extends from the TAF (in MS) to the IWF For a 240 bit RLP frame the header field comprises 16 bits, the information field 200 bits and the FCS 24 bits. The header and the information bits also depend on RLP version. The 200 bit L2R PDU is packed in the information field.

Figure 4A:
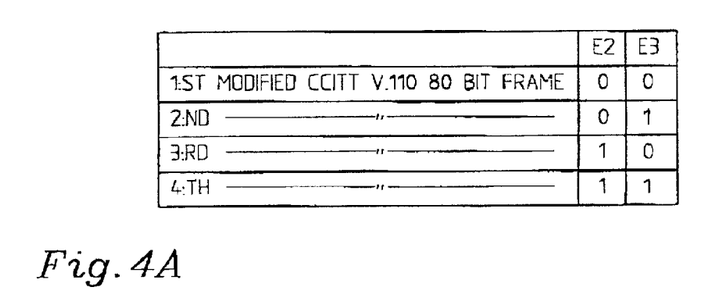
FIG. 4A shows the FSI values assigned to the E2 and E3 bits in the modified V.110 80 bit frames.
Figure 4B:
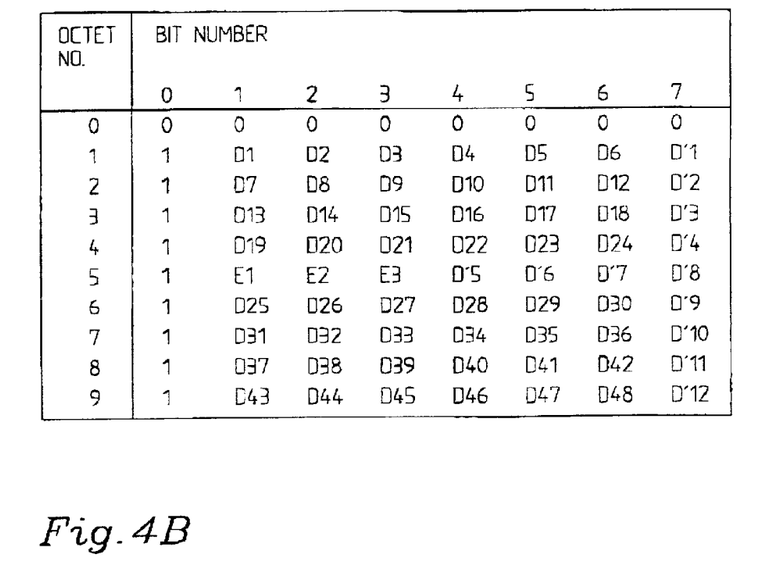
FIG. 4B is a table illustrating the modified CCITT V.110 80 bit frame for non-transparent data.

The above mentioned GSM Specification 08.20 specifies the interface between IWF and BSS. In the section 14 "Support of Non-Transparent Bearer Services" the TCH/F 9.6 and TCH/F 4.8 kbps channel codings are discussed, explaining that in case of non-transparent services the RA1/RA1' Rate Adapting function performs the same mapping as it is known from transparent services using 12 and 6 kbps radio interface data rates with a modification for the non-transparency. The E2 and E3 bits in the modified CCITT V.110 80 bit frames as shown in FIG. 4B are used to indicate each consecutive sequence of CCITT V.110 80 bit frames corresponding to the four modified CCITT V.110 60 bit frames received in one radio interface frame. This allows 240 bit radio link protocol frames to/from the MSC to be aligned with the 4×60 bit frames encoded by the radio subsystem channel coder as a single unit, cf. GSM 05.03. The 8 bits consisting of the E2 and E3 bits in one of the above sequences is referred to as a Frame Start Identifier FSI. The FSI value is 00 01 10 11, which value is assigned to the E2 and E3 bits as shown in FIG. 4A. This alignment possibility assists in facilitating the implementation of the present invention, here in the GSM system.

FIG. 5 was already discussed above and is a block diagram illustrating MS/TAF 10, BSS 25 and MSC/IWF 40 illustrating implementation of the invention to the GSM system supporting circuit switched data over the air interface wherein packet based communication is introduced between the base station (BTS) and the BSC (here forming the (second) switching arrangement). In an alternative implementation which is very advantageous, packet based transmission can be implemented all way from the base station (BTS) up to the MSC 40 (the (first) switching arrangement). In that case the additional features as illustrated in FIG. 5 are introduced into the MSC/IWF block 40 instead. In other aspects, the functioning is similar. This means that the functionalities introduced into TRAU 31 (Rate Adapting functions RA 1', RA 1 and RAX) are introduced into MSC/IWF block 40, particularly into the IWF 40. However, with the implementation of FIG. 5, the RLP FCS is calculated in BTS (CCU). Alternatively radio quality measurements are performed. However, in one embodiment radio quality measurements are performed in addition to the calculation of the PLP checksum.

FIG. 1B is a figure similar to FIG. 1A but referring to GPRS. Mobile station 10A communicates via BSS 25A with serving GPRS Support Node (SGSN) 40A which acts as a switching node similar to MSC. BSS 25A includes a BTS 20A and a BSC 30A. In this embodiment PCU (Packet Control Unit) 41A is provided at the BSC site, cf. GSM 03.60 V5.2.0. in general, section 12 (12.5) in particular. Information is transferred as PCU frames which are an extension to the TRAU-frames defined in GSM 08.60.

According to the invention packet switched (PS) transmission is introduced between BTS 20A and BSC 30A. BSC 30A in this embodiment contains the PCU functionality.

FIG. 1C shows an alternative implementation, cf. GSM 03.60 V5.2.0, section 12,5, wherein an MS 10B communicates via BSS 25B with SGSN 40B. In this case PCU 41B is provided in SGSN 40B, why SGSN here is denoted the (first) switching arrangement. Packet switched transfer (PS) of data is here according to the invention introduced between BTS 20B and SGSN 40B GPRS is e.g. described in the document GSM 03.60 V.5.2.0 and in Draft TS 100 960 V5.0.0 (1998-01) (GSM 03.60 Version 5.0.0). (For GPRS no filler frames are sent from SGSN to BSC as in the case described with reference e.g. to FIG. 8 for GSM.)

Figure 6:
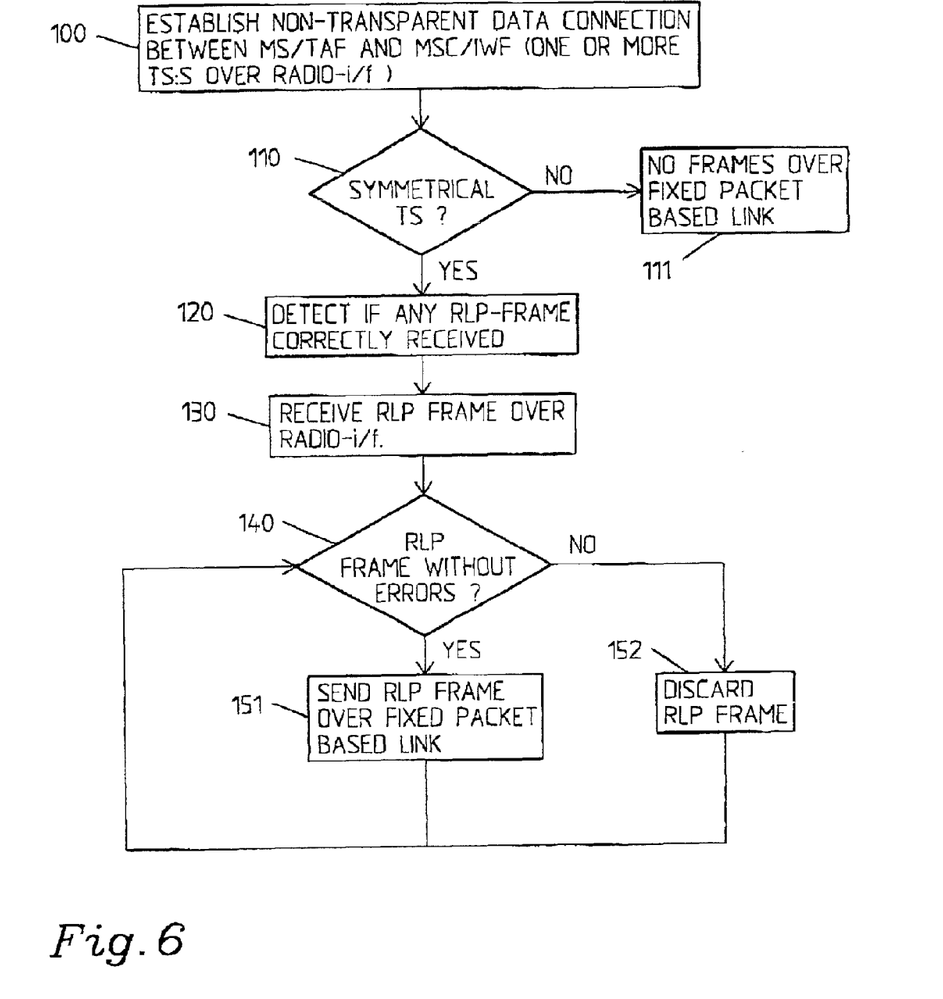
FIG. 6 is a flow diagram of the inventive procedure on the uplink towards a switching arrangement.

FIG. 6 is a block diagram describing the implementation of the inventive concept to the GSM system for circuit switched data on the uplink. The embodiment describes an implementation when packet based communication is introduced on the fixed link between BTS and BSC. First a non-transparent data connection between MS/TAF and MSC/IWF is established using one or more time slots over the radio interface, 100. In an advantageous implementation it is examined whether it is a symmetrical time slot, 110, and if not, no frames are sent over the fixed packet based (terrestrial) link, 111. This means that, at establishing a non-transparent data connection information is obtained about whether the time slot is symmetrical or not at an early stage. This examination is however not a requirement for the functioning of the present invention but merely constitutes an advantageous implementation. However, supposing that this functionality is implemented, and if it is established that the time slot is symmetrical, then means are established for detecting correctly received RLP frames, i.e. that the MS/TAF sent an RLP frame and that it was received without any bit errors, 120. Such a functionality is novel in the base station which checks on higher levels protocol than hitherto known to be used by BTS.

The RLP frame is then received over the radio interface, 130. Thereupon is checked if the RLP frame contains any errors, 140. Particularly the RLP checksum is examined to settle if it is correct. Alternatively radio quality measurements are performed, or both. If the RLP frame contains errors, the RLP frame is discarded, 152, which means that no frame is sent over the packet based terrestrial link.

If on the other hand the RLP frame contains no errors, the RLP frame is sent over the fixed packet based link, 151. The procedure is then repeated for subsequent frames.

This discloses the procedure on the uplink and bad frames can be disposed of already in the base station BTS instead of in the MSC. Advantageously the RLP checksum (RLP FCS) is used in BTS. This can be done without any trial decoding since the channel coding gives the RLP length and also which FCS that is used, cf. "RLP frames are sent in strict alignment with the radio transmission"; GSM 04.21 and RLP frames are of a fixed size of 240 (TCH/F 9.6 channel coding) or 576 bits (TCH/F 14.4 channel coding) cf. earlier remarks relating to 4.8 kbps and 14.4 kbps data.

Step 120 of the flow diagram is in one embodiment omitted since the RLP frame length and the checksum implicitly are given as the connection is established (step 100).

In an alternative embodiment consisting in using radio quality data, the channel type is also known from the establishment of the data connection.

For data 4.8 and 14.4 kbps it is possible to buffer a Channel Coding Block in BTS, i.e. await the subsequent CCB in order to get a full RLP-frame. However, this results in an extra delay of 20 ms. The preferred situation would be if it was possible to send each CCB as soon as it is received and packetize it into for example an IP-packet (or to use ATM or Frame Relay or other packet based solutions). If CRC calculations are initiated already at reception of the first CCB, it can not be established if the Whole RLP-frame was corrupt until the second CCB is received. In other words, the first CCB is already sent out. In an alternative implementation handling this problem, this approach can be implemented in combination with radio quality measurements.

Figure 7:
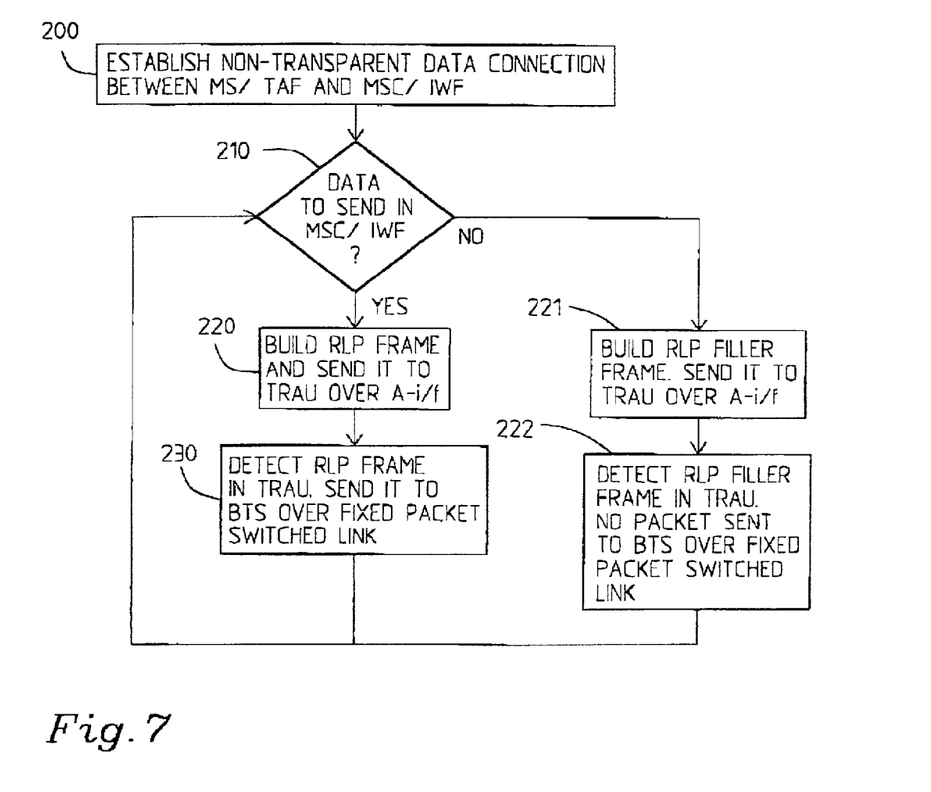
FIG. 7 is a flow diagram describing the inventive procedure on the downlink towards the Base Transceiver Station.

In FIG. 7 the corresponding procedure on the downlink is described. It also discloses an embodiment in which packet based transmission is introduced between BSC (TRAU) and the base station (BTS). However, as referred to earlier, packet based transmission can be provided for between MSC and BTS in which case the functionalities (specific for the invention) of the TRAU are performed in the MSC instead. However, returning to FIG. 7, it is supposed that a non-transparent data connection between MS/TAF and MSC/IWF is established, 200, then is established whether there is any data to send in MSC/IWF, 210. If yes, an RLP frame is built and sent to TRAU (in BSC) over the A-interface, 220. The RLP frame is then detected in TRAU and from there it is sent over the fixed packet based link to BTS, 230. If however it in step 210 is detected there is no data to be sent in MSC/IWF, an RLP filler frame is built and sent to TRAU over the A-interface, 221. In the alternative embodiment in which packet based data is introduced between MSC and BSC, there is no need to build an RLP filler frame. However, supposed there is only introduced packet based transmission between the BSC and BTS, the RLP filler frame is detected in TRAU (BSC) and no packet is sent over the packet switched link to BTS, 222. The procedure is then repeated for subsequent frames.

Figure 8:
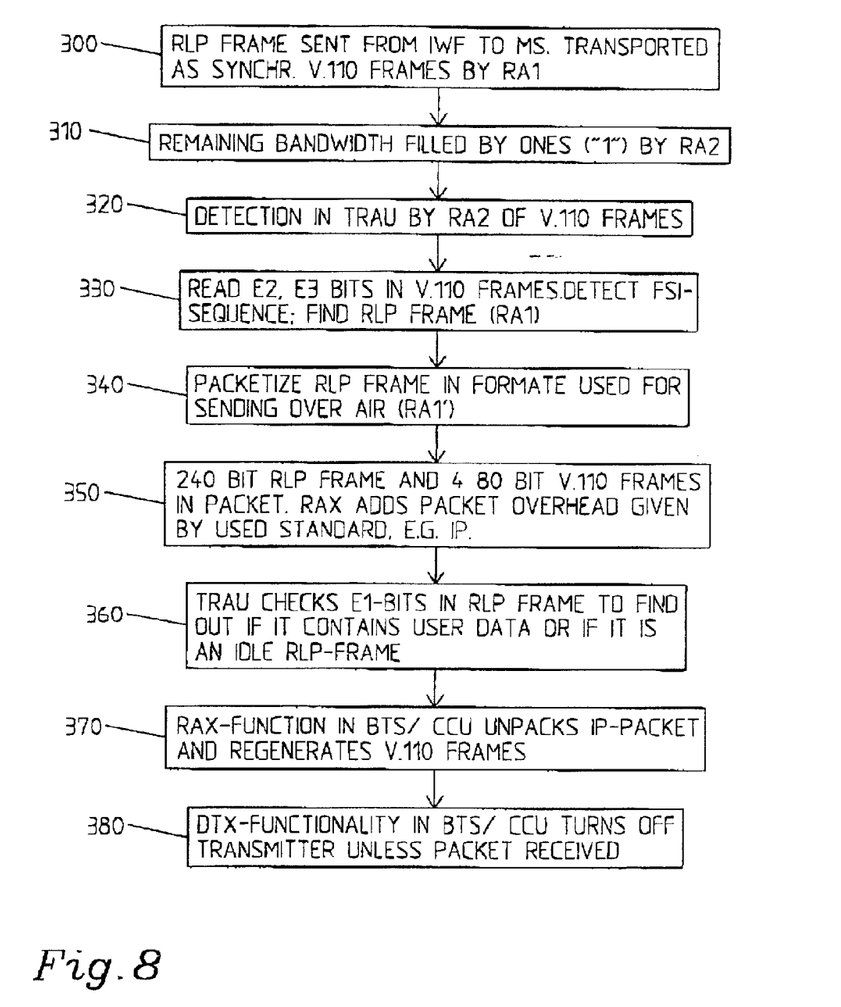
FIG. 8 is a flow diagram describing the procedure on the downlink more in detail.

In FIG. 8 the procedure on the downlink is described more in detail for GSM and wherein packet based communication is introduced between BSC and BTS. It is first supposed, 300, that an RLP frame is sent from IWF to MS. The transportation of the RLF frame takes place on a lower layer in the form of synchronous V.110 frames. This is handled by RA 1 as disclosed in FIG. 5. RA 1 gives a synchronous stream of V.110 frames with a bit rate of 16 kbps which corresponds to a bit rate of 9.6 kpbs over the air. Subsequently the spare bandwidth or the remaining bandwidth is filled by one's ("1") (for example). The reason therefor is that a 64 kbps channel always is allocated between MSC and BSS. This is handled by RA 2 (cf. FIG. 5), 310. Subsequently the TRAU unit (in BSC) detects V.110 frames. Rate Adapting functionality RA 2 performs this functionality using the synchronization pattern on the allocated 64 kpbs channel, 320.

The TRAU unit, in state of the art systems, packs data corresponding to four V.110 frames in one TRAU frame which is the format used between the base station BTS (CCU) and TRAU. In state of the art systems TRAU has no functionality to see which is the content of the V.110 frames. This means that TRAU for example does not know if it is a transparent or a non-transparent service. (In the present invention the above packing into a TRAU frame is replaced through packing RLP frames into an IP-packet.)

If a packet based solution is defined, each V.110 frame can be sent in a packet, for example an IP-packet, but still this information will not be provided. According to another solution four V.110 frames are also packed into an IP-packet, which then is sent. However, in order to increase the transmission efficiency through the use of DTX, a functionality must be provided which can establish the content in the V.110 frames.

Thus a function that can read the E2, E3 bits in the V.110 frames and which detects the ESI sequence, in other words can find an RLP frame, is needed. Alternatively, to inform TRAU that it is a non-transparent service, information thereon can be provided in signalling at call set up. However, normally the other method works satisfactorily since the E-bits in case of a transparent service are given a constant value indicating bitrate.

This was discussed with reference to FIGS. 4A, 4B. Thus in a subsequent step the E2, E3 bits in the V.110 frames are read and the FSI sequence is detected which means that an RLP frame is found, 330. This function is performed in a similar manner to that as performed by RA 1 in BTS. Furthermore the RLP frame is packed in the format used for transmission over the air (except for the channel coding which is introduced by the FEC functionality). This corresponds to the RA 1' functionality, 340. Then information is available for sending in a packet of 4×60 bits (corresponding to a 240 bit RLP frame and four 80 bit V.110 frames, totally 320 bits, which means that the V.110 synchronisation is what differs). Thus a 240 bit RLP frame and four 80 bit V.110 frames are arranged in a packet. The RAX functionality as shown in FIG. 5 adds the packet overhead given by the used standard, for example IP, 350. TRAU then checks the E1 bits in the RLP frame to find out if it contains user data or if it is an idle RLP frame. If it is a "1" then it is an idle RLP frame, 360. In BTS/CCU the RAX functionality is provided for unpacking the IP packet and regenerating V.110 frames, 370.

The functionality synchronizing the V.110 bit stream with an RLP frame, i.e. RA 1, will here be simplified since it is known that an IP packet always represents an RLP frame. E1, E2 and E3 are not sent in this direction. Finally the DTX functionality in BTS/CCU will be a step of determining if a packet has been received. Then it has to be sent. If no packet is received, the transmitter is to be turned off, 380.

The detailed procedure on the uplink will not be described in a flow diagram. The differences as compared to the used standards is that BTS/CCU knows that all frames that are received comprises an RLP frame since there are no E bits send over the air. The detection is here performed to detect whether it is an RLP frame that has been sent or not and also to detect if it contains any bit errors. This is advantageously performed using the RLP checksum as referred to earlier.

Alternatively radio quality data can be used. (This can also be used as a complement to the RLP checksum embodiment.) A threshold can then be applied on the received Channel Coding Block to distinguish whether the MSS sent some bursts or not. The threshold has to be based on soft information from the Equalizer and Channel Decoder. The threshold may for example be defined to rule blocks with bursts of very low energy, i.e. the MS transmitter is turn off. However, in case there is interference, this method can be provided with soft quality measurements from the Channel Decoder. Since this method only relies on soft information, in an advantageous embodiment, an offset of the threshold towards not dropping the frames in order not to loose any good frames is used. The efficiency may be somewhat lower than that as provided for by the solution using the RLP checksum.

In FIG. 6 the functionality on RLP level (RLP FCS) comprises a calculation of the RLP checksum. On the downlink this functionality is advantageously implemented but it is not necessary. If the RLP checksum is calculated on the downlink, this is for example done in order to avoid to send corrupt data over the air in case there have been bit errors on the fixed transmission. The remaining steps correspond to those as described above with reference to the downlink procedure but in the opposite order.

As referred to earlier, the invention is likewise applicable to a digital mobile communication system supporting communication of packet data, for example GPRS which is the GSM packet data service, PPDC which is the packet data service for PDC etc. The used communication protocol RLP is for GPRS then replaced by the RLC protocol, the interworking function means comprise a PCU (Packet Control Unit), the MSC node corresponds to the SGSN node (Serving GPRS Support Node) etc. as referred to in FIGS. 1B, 1C. In other aspects the solution is similar. Statistical multiplexing of non-transparent data is then being implemented on a radio interface between mobile stations and base stations.

Moreover, the invention is applicable to different kinds of systems and particularly may circuit switched transfer of data e.g. for GSM (or a similar system with a circuit switched core network) be implemented as well as packet switched transfer of data over the radio interface for such a system with a circuit switched core network.

In addition thereto it is applicable in the case circuit switched transfer of data over e.g. the radio interface is implemented for a system (e.g. GPRS) having a packet switched core network.

The invention is of course not limited to the explicitly illustrated embodiments but it can be varied in a number of ways within the scope of the appended claims.

What is claimed is:

1. A mobile communication system supporting communication of data and comprising:
   at least one base station, comprising a Base Transceiver Station, connected to a switching arrangement over a connection and using a communication protocol for communication between a mobile station and the switching arrangement, wherein;
   (a) the connection between the base station and the switching arrangement, comprising a Base Station Controller, supporting packet switched non-transparent communication of data transported as data frames at least on the uplink between the Base Transceiver Station and the Base Station Controller;
   (b) the base station includes
      means for detecting if data frames sent from the mobile station are correctly received over the air interface, and
      means for sending only data frames detected as correctly received on to the switching arrangement using the packet switched connection between the base station and the switching arrangement, wherein
   (c) the Base Station Controller includes transcoding and adapting means for communication with an interworking function of a mobile switching center which comprises means for building frames for transportation of data; and
   the transcoding and adapting means detects if frames received from the mobile switching center contain data and sending only data frames on to the base station.

2. The system of claim 1, wherein the non-transparent communication of data transported as data frames is established on the uplink from the mobile station.

3. The system of claim 2, wherein the means for detecting comprising means for calculating a frame checksum for a received data frame.

4. The system of claim 3, wherein the quality of the radio transmission is detected in the base station to detect if a data frame is correctly received.

5. The system of claim 1, wherein the switching arrangement comprises a Mobile Switching Center.

6. The system of claim 1, wherein the packet switched communication of data is supported between the base station and the switching arrangement on the downlink.

7. A method of transmitting data in a mobile communication system, the method comprising the steps of:
   establishing a non-transparent data connection between a mobile station and a switching arrangement, comprising an air interface between the mobile station and a base station and a packet switched connection between the base station and the switching arrangement;
   detecting in the base station if data frames sent from the mobile station are correctly received over the air interface and using a frame checksum defined in non-transparent data protocol to establish if the data frames are correctly received;
   sending only data frames detected as correctly received on to the switching arrangement using the packet switched connection between the base station and the switching arrangement; and
   detecting in the base station if a received time slot from the mobile station is symmetrical, and, only if the time slot is symmetrical, sending data packets over the packet switched connection to the switching arrangement.

8. The method of claim 7, further comprising the step of:
   performing radio quality measurements in the base station to establish if data frames are correctly received over the air interface from the mobile station.

9. The method of claim 7, further comprising the step of;
   implementing packet switched transmission on the downlink from the switching arrangement to the base station.

* * * * *